(12) United States Patent
Kang

(10) Patent No.: US 8,917,460 B2
(45) Date of Patent: Dec. 23, 2014

(54) FIXED FOCUS LENS SYSTEM

(75) Inventor: Mi-won Kang, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 109 days.

(21) Appl. No.: 13/589,825

(22) Filed: Aug. 20, 2012

(65) Prior Publication Data
US 2013/0063829 A1  Mar. 14, 2013

(30) Foreign Application Priority Data
Sep. 14, 2011  (KR) .......................... 10-2011-0092563

(51) Int. Cl.
*G02B 9/10*  (2006.01)
*G02B 9/04*  (2006.01)
*G02B 13/04*  (2006.01)

(52) U.S. Cl.
CPC  *G02B 13/04* (2013.01); *G02B 9/10* (2013.01); *G02B 9/04* (2013.01)
USPC .......................................... 359/793; 359/761

(58) Field of Classification Search
CPC .............. G02B 3/02; G02B 9/00; G02B 9/04; G02B 9/10; G02B 9/12; G02B 9/34; G02B 9/60; G02B 9/62; G02B 9/64
USPC ....................................................... 359/793
See application file for complete search history.

(56) References Cited

U.S. PATENT DOCUMENTS

| | | | |
|---|---|---|---|
| 5,731,912 A | 3/1998 | Abe | |
| 6,377,404 B1 | 4/2002 | Goosey, Jr. | |
| 8,213,096 B2 * | 7/2012 | Tsutsumi | 359/784 |
| 2009/0034090 A1 | 2/2009 | Eguchi | |
| 2010/0195221 A1 * | 8/2010 | Sato | 359/753 |
| 2010/0296180 A1 * | 11/2010 | Sudoh et al. | 359/793 |
| 2011/0169912 A1 | 7/2011 | Abe et al. | |

FOREIGN PATENT DOCUMENTS

| | | |
|---|---|---|
| JP | 7-120672 A | 5/1995 |
| JP | 2001-201684 A | 7/2001 |
| JP | 2006-11093 A | 1/2006 |
| JP | 2009-37091 A | 2/2009 |
| JP | 2009-230040 A | 10/2009 |
| JP | 2010-78930 A | 4/2010 |
| KR | 10-0272337 B1 | 8/2000 |
| KR | 10-2005-0028064 A | 3/2005 |

* cited by examiner

*Primary Examiner* — Darryl J Collins
(74) *Attorney, Agent, or Firm* — Sughrue Mion, PLLC

(57) ABSTRACT

A fixed focus lens system includes a first lens group having a negative refractive power; and a second lens group having a positive refractive power, wherein the first lens group and the second lens group are sequentially arranged from an object side to an image side, and the second lens group includes two lenses having an Abbe's number of 80 or greater.

15 Claims, 10 Drawing Sheets

FIXED FOCUS LENS SYSTEM

CROSS-REFERENCE TO RELATED PATENT APPLICATION

This application claims priority from Korean Patent Application No. 10-2011-0092563, filed on Sep. 14, 2011, in the Korean Intellectual Property Office, the disclosure of which is incorporated herein in its entirety by reference.

BACKGROUND

1. Field

Apparatuses consistent with exemplary embodiments relate to a fixed focus lens system.

2. Description of the Related Art

As electronic imaging devices such as a complementary metal-oxide semiconductor (CMOS) and digital storage devices have been developed, high-pixel characteristics at the level of mega-pixels have been obtained, and demand for lenses suitable to obtain these high-pixel characteristics has increased.

For example, a fixed focus lens used in surveillance cameras such as closed circuit television (CCTV) includes a wide-angle, large-aperture lens so as to monitor a dark space over a wide area, and is required to be able to correct optical aberrations of peripheral portions so as to check the smallest characteristic information of a subject. In addition, changes in focus caused due to variation of a wavelength of light from visible rays to infrared rays as day turns to night needs to be corrected.

SUMMARY

One or more exemplary embodiments provide a fixed focus lens system in which a focus distortion due to variation in a wavelength of light rays during day and night is reduced.

According to an aspect of an exemplary embodiment, there is provided a fixed focus lens system comprising: a first lens group having a negative refractive power; and a second lens group having a positive refractive power, wherein the first lens group and the second lens group are sequentially arranged from an object side to an image side, and the second lens group includes two lenses having an Abbe's number of 80 or greater.

The first lens group may comprise a first lens having a negative refractive power, a second lens having a negative refractive power, and a third lens having a positive refractive power, wherein the first through third lenses are sequentially arranged from the object side to the image side.

The second lens group may comprise a fourth lens having a positive refractive power, a fifth lens having a positive refractive power, and a sixth lens having a negative refractive power, wherein the fourth through sixth lenses are sequentially arranged from an object side to an image side.

The fifth lens and the sixth lens may form a doublet lens.

The fourth lens may be formed of a material having an Abbe's number of 80 or greater. The fifth lens may be formed of a material having an Abbe's number of 80 or greater.

The first through sixth lenses may be spherical lenses.

A focal length f1 of the first lens group and a focal length f2 of the second lens group may satisfy the following condition:

$$0.94 < |f1/f2| < 1.06.$$

An Abbe's number v3 of the third lens and an Abbe's number v4 of the fourth lens may satisfy the following condition:

$$0.25 < v3/v4 < 0.33.$$

An F-number may be equal to or less than 1.85.

A back focal length BFL and an entire focal length EFL may satisfy the following condition:

$$BFL/EFL > 2.5.$$

According to an aspect of another exemplary embodiment, there is provided a surveillance camera comprising: a fixed focus lens system described above; an imaging device converting an optical image formed by using the fixed focal lens system, into an electrical signal; and a day-and-night filter converting unit disposed between the fixed focus lens system and the imaging device.

BRIEF DESCRIPTION OF THE DRAWINGS

The above and other aspects will become more apparent by describing in detail exemplary embodiments thereof with reference to the attached drawings, in which.

DETAILED DESCRIPTION

Figure 1:
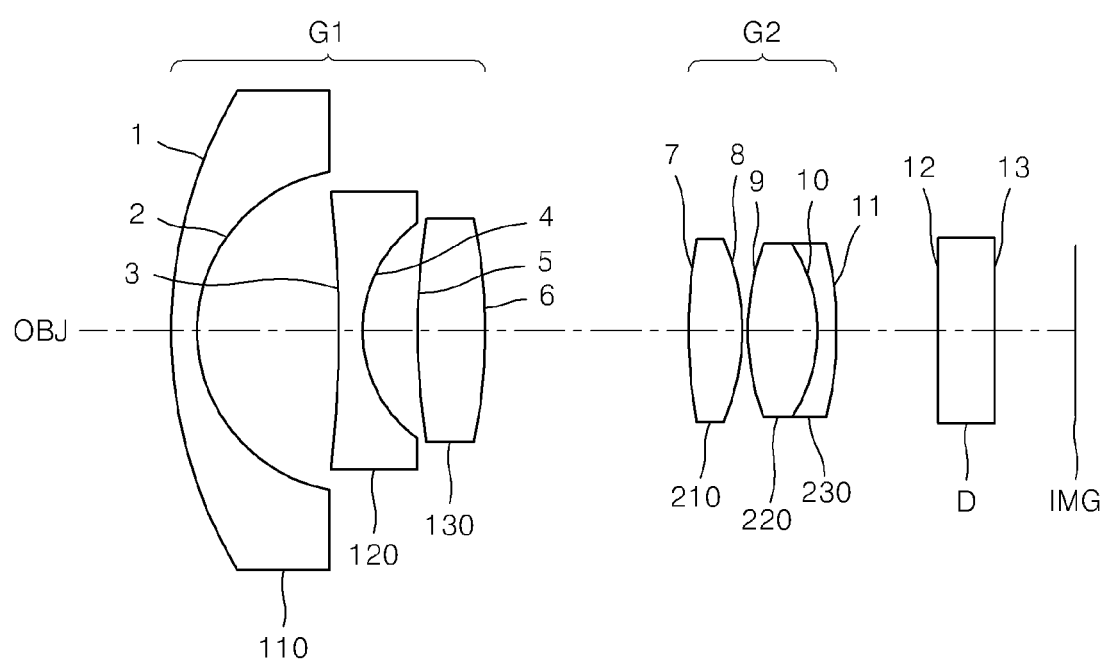
FIG. 1 illustrates an optical arrangement of a fixed focus lens system according to an exemplary embodiment.

Exemplary embodiments will now be described more fully with reference to the accompanying drawings In the drawings, sizes of elements may be exaggerated for clarity and convenience of description. As used herein, the term "and/or" includes any and all combinations of one or more of the associated listed items.

Figure 6:
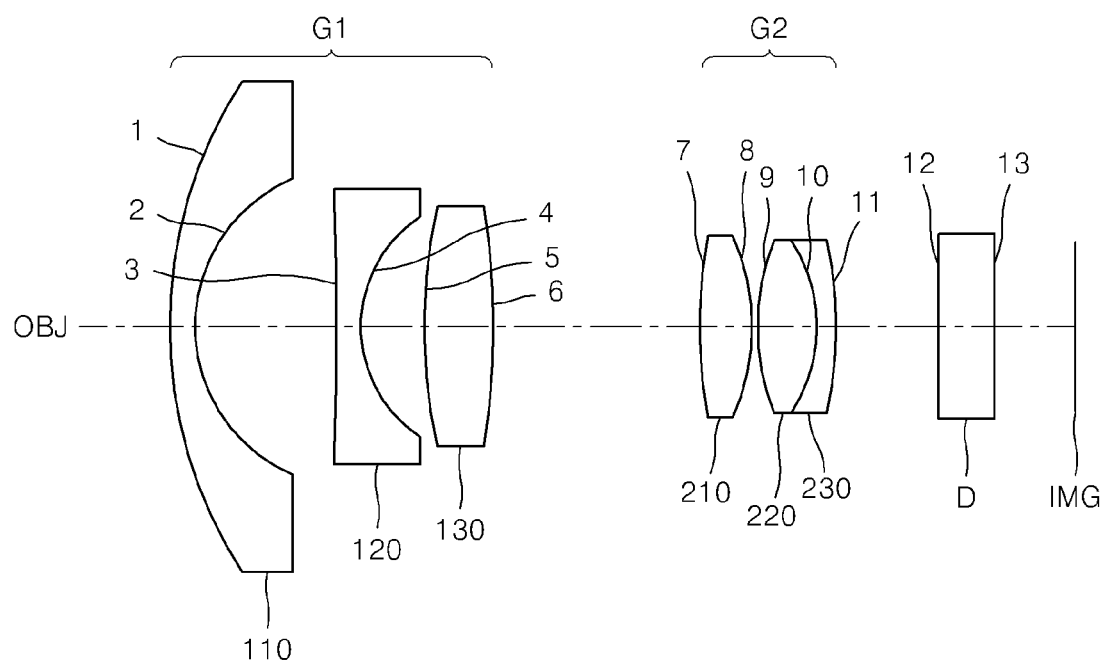
FIG. 6 illustrates an optical arrangement of a fixed focus lens system according to another exemplary embodiment.

FIGS. 1 and 6 respectively illustrate optical arrangements of fixed focus lens systems according to exemplary embodiments.

Referring to FIGS. 1 and 6, each of the fixed focus lens systems includes a first lens group G1 having a negative refractive power and a second lens group G2 having a positive refractive power, which are sequentially arranged from an object side OBJ to an image side IMG.

Lenses of the fixed focus lens system according to the embodiments use a lens material having a large Abbe's number so as to reduce as much as possible a difference between focal lengths with respect to light of different wavelengths, for example, in order to reduce a difference between a focal length with respect to visible rays and a focal length with respect to infrared rays. For example, the second lens group G2 may include two lenses having an Abbe's number of 80 or greater.

The first lens group G1 may include a first lens 110 having a negative refractive power, a second lens 120 having a negative refractive power, and a third lens 130 having a positive refractive power that are sequentially arranged from the object side OBJ to the image side IMG. The first lens 110 may have a meniscus shape that is convex toward the object side OBJ, the second lens 120 may be bi-concave, and the third lens 130 may be bi-convex. However, the shape of the first lens group G1 is not limited as illustrated.

The second lens group G2 may include a fourth lens 210 having a positive refractive power, a fifth lens 220 having a positive refractive power, and a sixth lens 230 having a negative refractive power that are sequentially arranged from the object side OBJ to the image side IMG. The fifth lens 220 and the sixth lens 230 may form a doublet lens. By bonding the fifth lens 220 formed of a material having a relatively large Abbe's number and the sixth lens 230 formed of a material having a relatively small Abbe's number, chromatic aberration is to be corrected. The fourth lens 210 may be bi-convex, the fifth lens 220 may be bi-convex, and the sixth lens 230 may have a meniscus shape that is convex toward the image side I. However, the shape of the second lens group G2 is not limited to that illustrated in the figures.

The fixed focus lens system according to the above embodiments are formed of a lens material having a large Abbe's number so as to reduce as much as possible a difference between focal lengths with respect to light of different wavelengths, for example, a difference between a focal length with respect to visible rays and a focal length with respect to infrared rays. For example, the fourth lens 210 and/or the fifth lens 220 are formed of a material having an Abbe's number of 80 or greater.

The image side IMG is an imaging plane of an imaging device (not shown) such as a charge coupled device (CCD) or a complementary metal-oxide semiconductor (CMOS).

A member D is a dummy glass, and for example, an optical low pass filter (OLPF) may be included at this location of the member D. Alternatively, to use a fixed focus lens system in a surveillance camera, a day-and-night filter converting unit may be included at this location. The day-and-night filter converting unit controls a filter according to an amount of light such that the OLPF operates during day and the OLPF does not operate during night.

The fixed focus lens system may include the first lens group G1 and the second lens group G1 including lenses satisfying the following condition:

$$0.94 \leq |f1/f2| < 1.06 \quad (1),$$

where f1 denotes a focal length of the first lens group G1, and f2 denotes a focal length of the second lens group G2.

Condition (1) determines a range of a ratio of the focal lengths of the first lens group G1 and the second lens group G2, and accordingly, refractive powers of the first lens group G1 and the second lens group G2 are appropriately distributed to improve resolution. For values higher than the upper limit of condition (1), spherical aberration and longitudinal chromatic aberration increase to decrease optical performance. Also, for values smaller than the lower limit of condition (1), astigmatism and coma increase to decrease optical performance.

In addition, the fixed focus lens system may further satisfy the following condition:

$$2.5 < v3/v4 \leq 3 \quad (2),$$

where v3 and v4 are an Abbe's number of the third lens 130 and an Abbe's number of the fourth lens 210.

When the fixed focus lens system is outside the above range, an optimum focus position varies as a wavelength varies from a visible ray area to a near-infrared area. That is, a defocus amount according to the variation in wavelengths increases.

In addition, the fixed focus lens system may further satisfy the following condition:

$$Fno \leq 1.85 \quad (3),$$

where Fno denotes an F-number, and the above condition defines luminance of the fixed focus lens system, and accordingly, the fixed focus lens system has luminance that is appropriate for the fixed focus lens system to be applied to a surveillance camera.

In addition, the fixed focus lens system may further satisfy the following condition:

$$BFL/EFL > 2.5 \quad (4),$$

where BFL denotes a back-focal length, and EFL denotes an entire focal length. BFL denotes a distance between a lens surface of the fixed focus lens closest to the image side IMG and the image side IMG, and condition (2) is to provide a sufficient BFL for, for example, a day-and-night filter converting unit to be included at this location.

Hereinafter, specific lens data according to various embodiments of the fixed focal lens system according to the embodiments will be described.

Hereinafter, EFL denotes a focal length of the fixed focus lens system, and Fno denotes an F-number of the fixed focus lens system, and 2ω denotes a viewing angle of the fixed focus lens system.

First Embodiment

Figure 2:
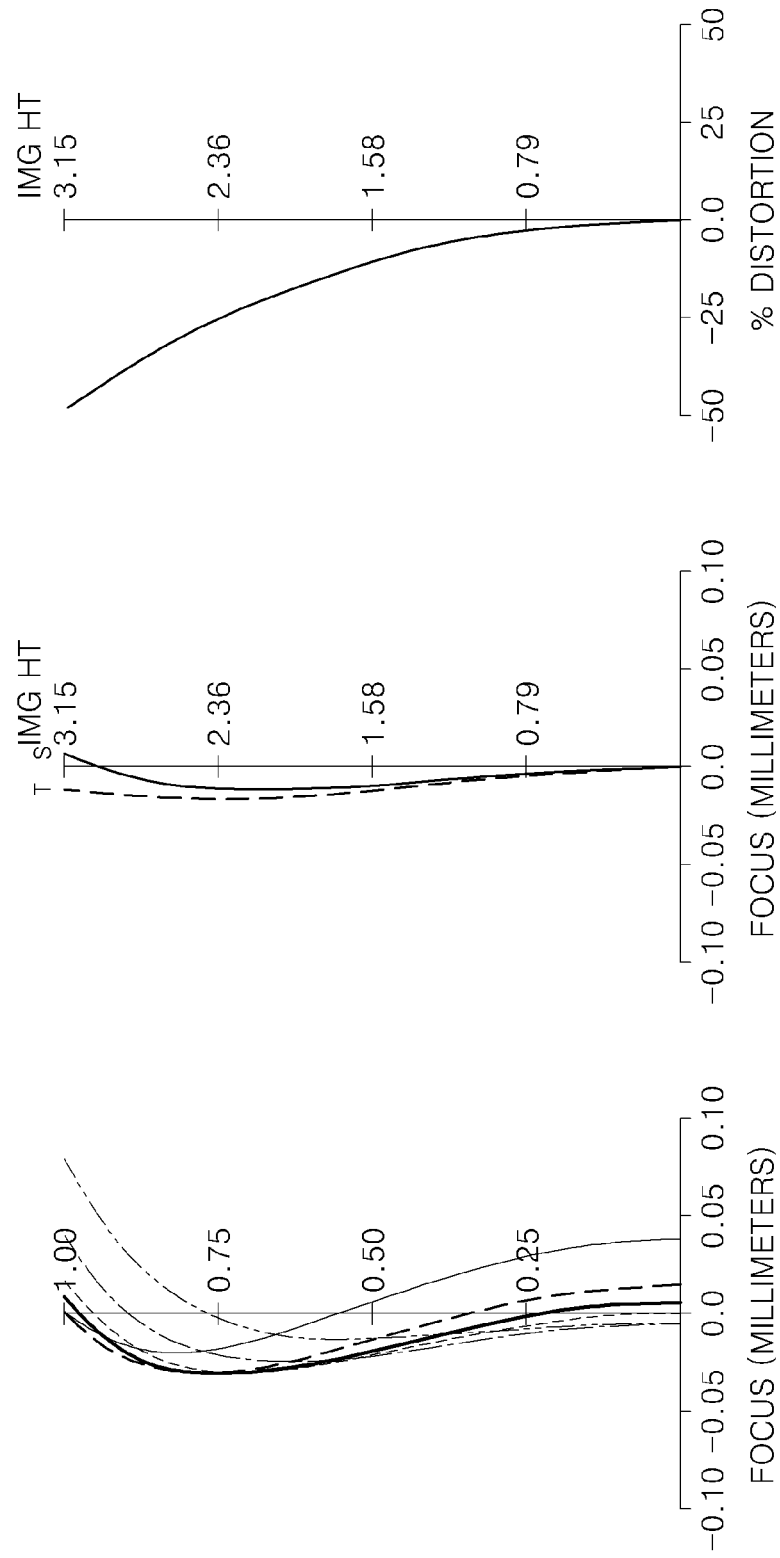
FIG. 2 illustrates spherical aberration, astigmatic field curves, and distortion of the fixed focus lens system of FIG. 1, according to an exemplary embodiment.
Figure 3:
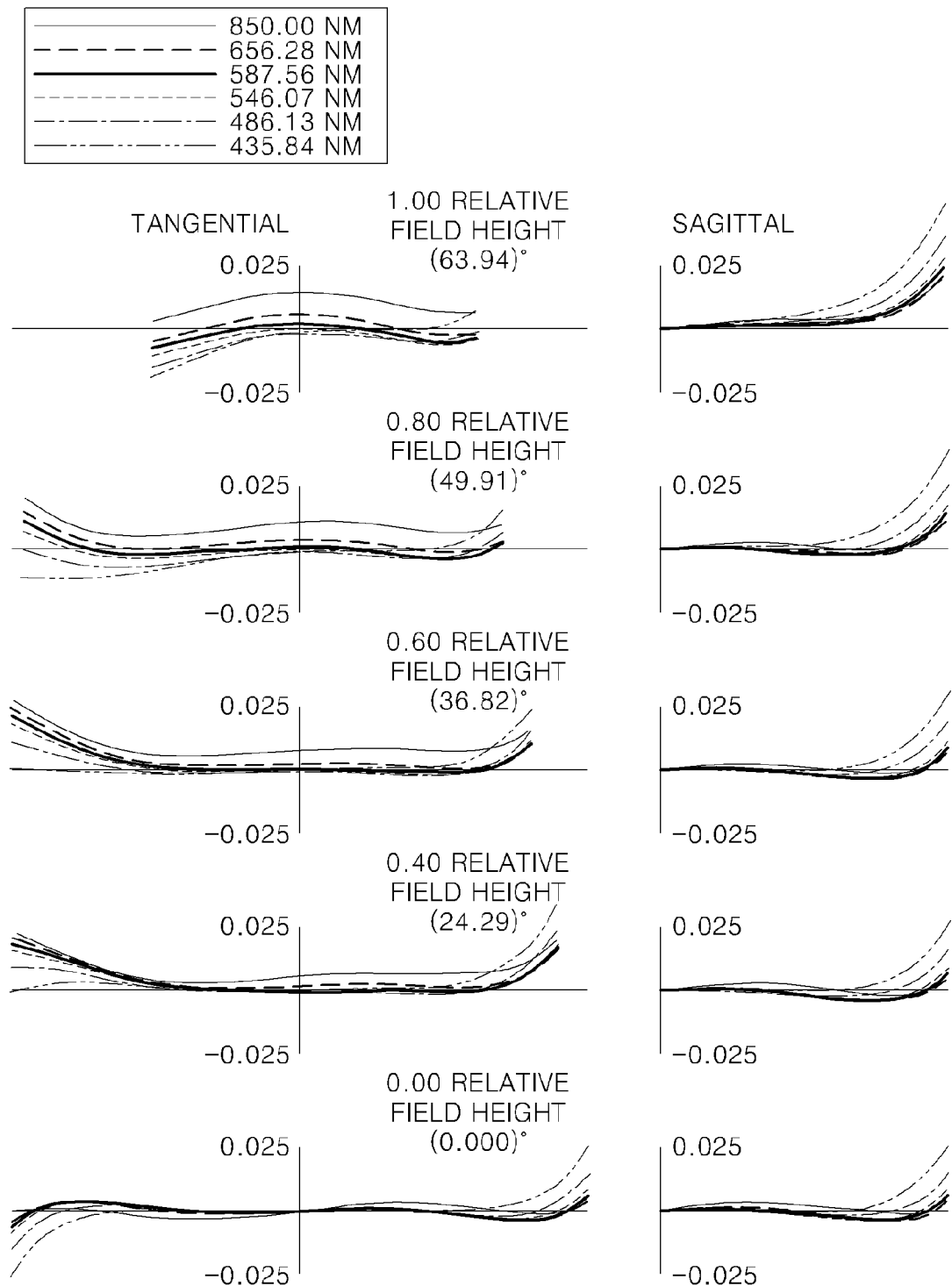
FIG. 3 illustrates coma aberration of the fixed focus lens system of FIG. 1, according to an exemplary embodiment.

FIG. 1 illustrates an optical arrangement of a fixed focus lens system according to an embodiment. FIG. 2 illustrates longitudinal spherical aberration, astigmatic field curves, and distortion of the fixed focus lens system of FIG. 1. FIG. 3 illustrates coma aberration of the fixed focus lens system of FIG. 1. The longitudinal spherical aberration and coma aberration are shown with respect to light having a wavelength of 850.00 nm, 656.28 nm, 587.56 nm, 546.07 nm, 486.13 nm, 435.84 nm, and the astigmatic field curves show tangential field curvature (T) and sagittal field curvature (S) with respect to light having a wavelength 546.07 nm, and distortion is with respect to light having a wavelength of 546.07 nm.

Figure 4:
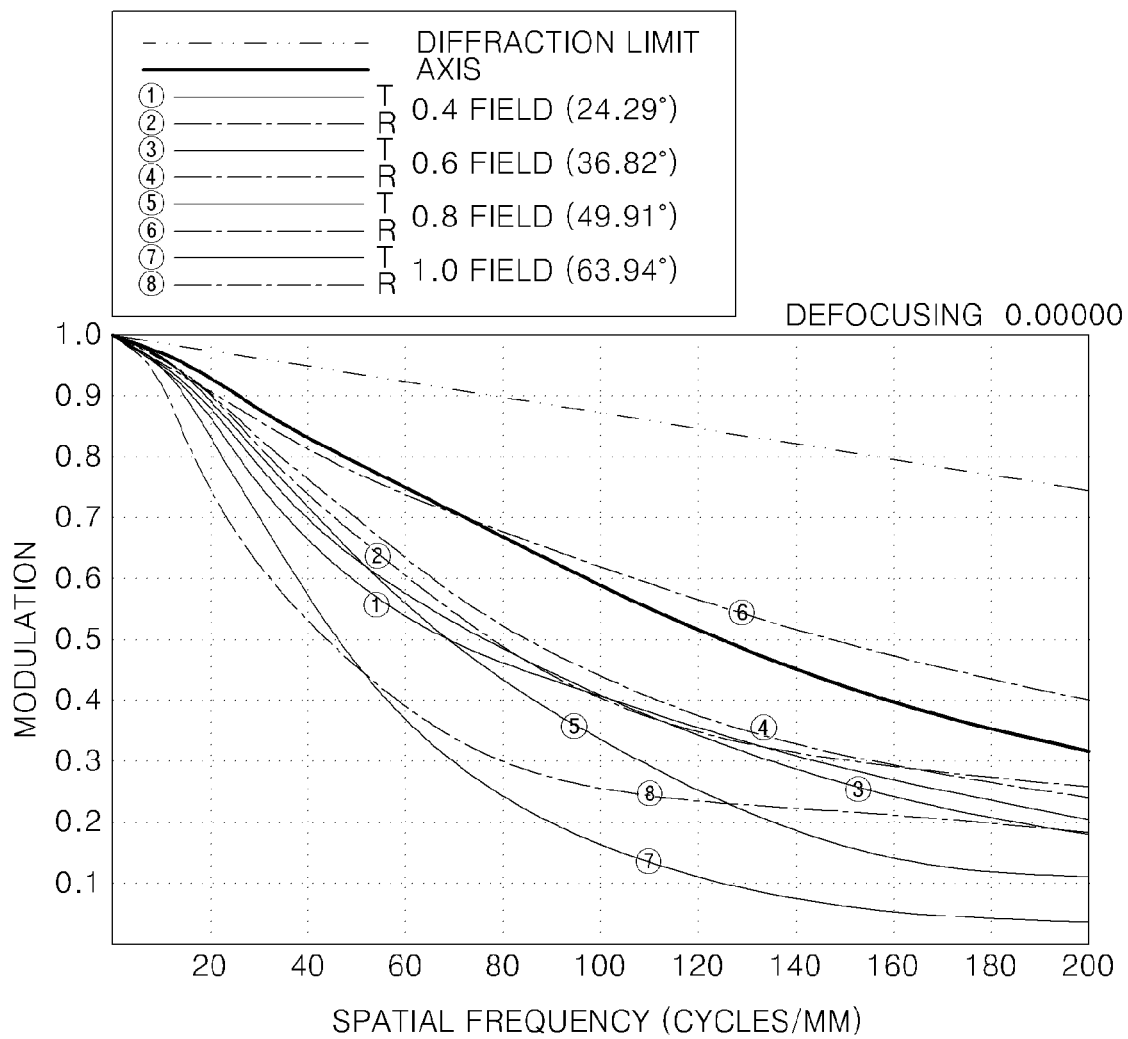
FIG. 4 is a modulation transfer function (MTF) graph of visible rays of the fixed focus lens system of FIG. 1, according to an exemplary embodiment.
Figure 5:
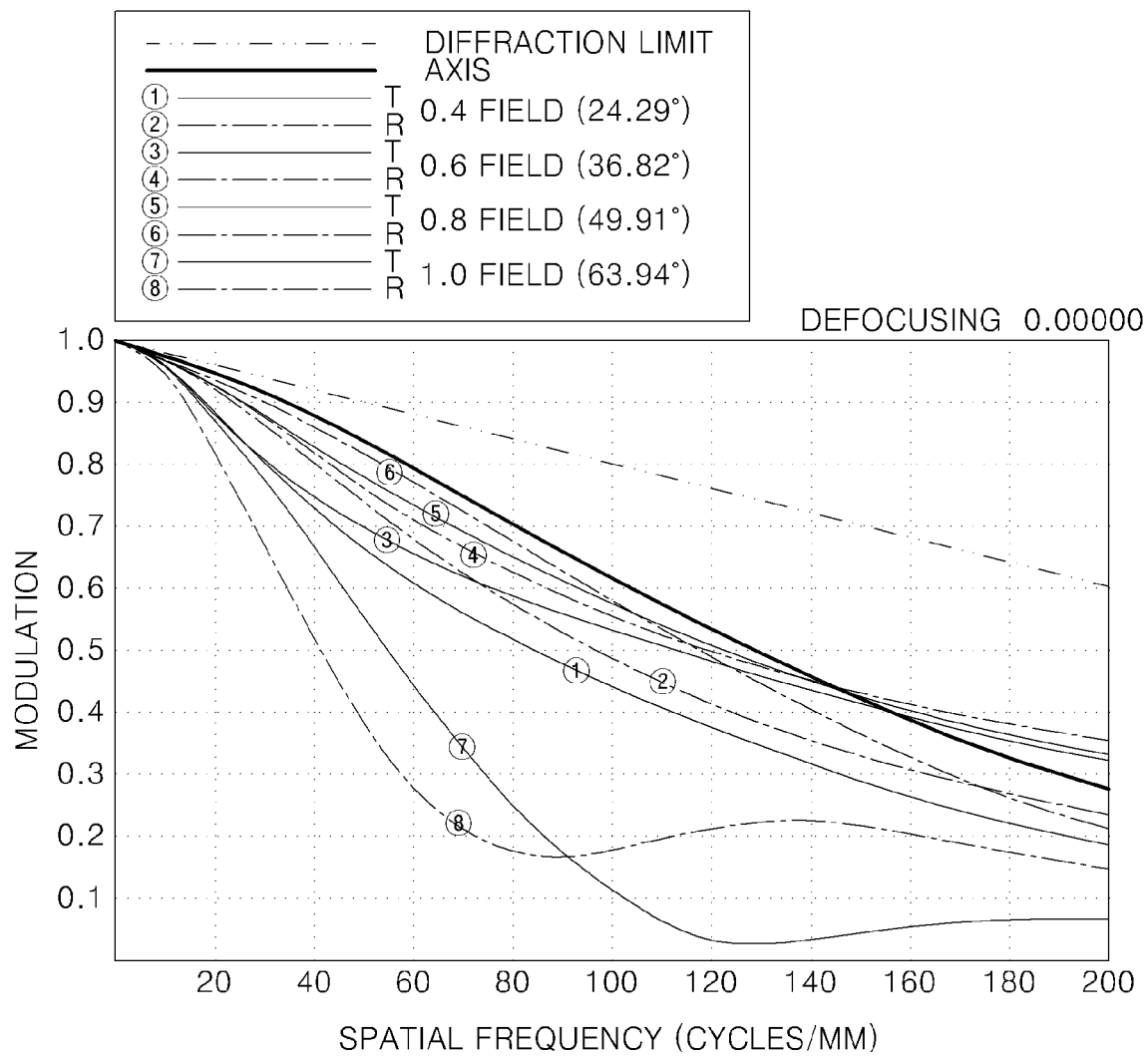
FIG. 5 is a MTF graph of near-infrared rays of the fixed focus lens system of FIG. 1, according to an exemplary embodiment.

FIG. 4 is a modulus transfer function (MTF) graph of visible rays of the fixed focus lens system of FIG. 1. FIG. 5 is a MTF graph of near-infrared rays of the fixed focus lens system of FIG. 1. Referring to the MTF graphs, a horizontal axis denotes spatial frequency, a vertical axis denotes modulation of an optical transfer function, dotted lines denote a tangential field, and a solid line denotes a sagittal field.

Tables 1 and 2 show lens data of the fixed focus lens system of FIG. 1.

TABLE 1

| | |
|---|---|
| EFL | 3.00 |
| Fno | 1.85 |
| \|f1/f2\| | 0.995 |
| 2ω | 127.88° |

TABLE 2

| Field | Curvature radius | Thickness or distance | Refractive index | Abbe's number |
|---|---|---|---|---|
| 1 | 17.09 | 1.00 | 1.744002 | 44.7200 |
| 2 | 6.00 | 5.00 | | |
| 3 | −42.73 | 0.90 | 1.620409 | 60.3438 |
| 4 | 5.00 | 2.07 | | |
| 5 | 29.55 | 2.50 | 1.846663 | 23.7848 |
| 6 | −23.30 | 7.52 | | |
| 7 | 19.96 | 2.00 | 1.496997 | 81.6084 |
| 8 | −8.36 | 0.20 | | |
| 9 | 9.064 | 2.60 | 1.496997 | 81.6084 |
| 10 | −5.60 | 0.70 | 1.846663 | 23.7848 |
| 11 | −13.13 | 1.75 | | |
| 12 | Infinity | 3.75 | | |
| 13 | Infinity | 2.10 | 1.516800 | 64.1673 |
| IMG | Infinity | 3.00 | | |

Second Embodiment

Figure 7:
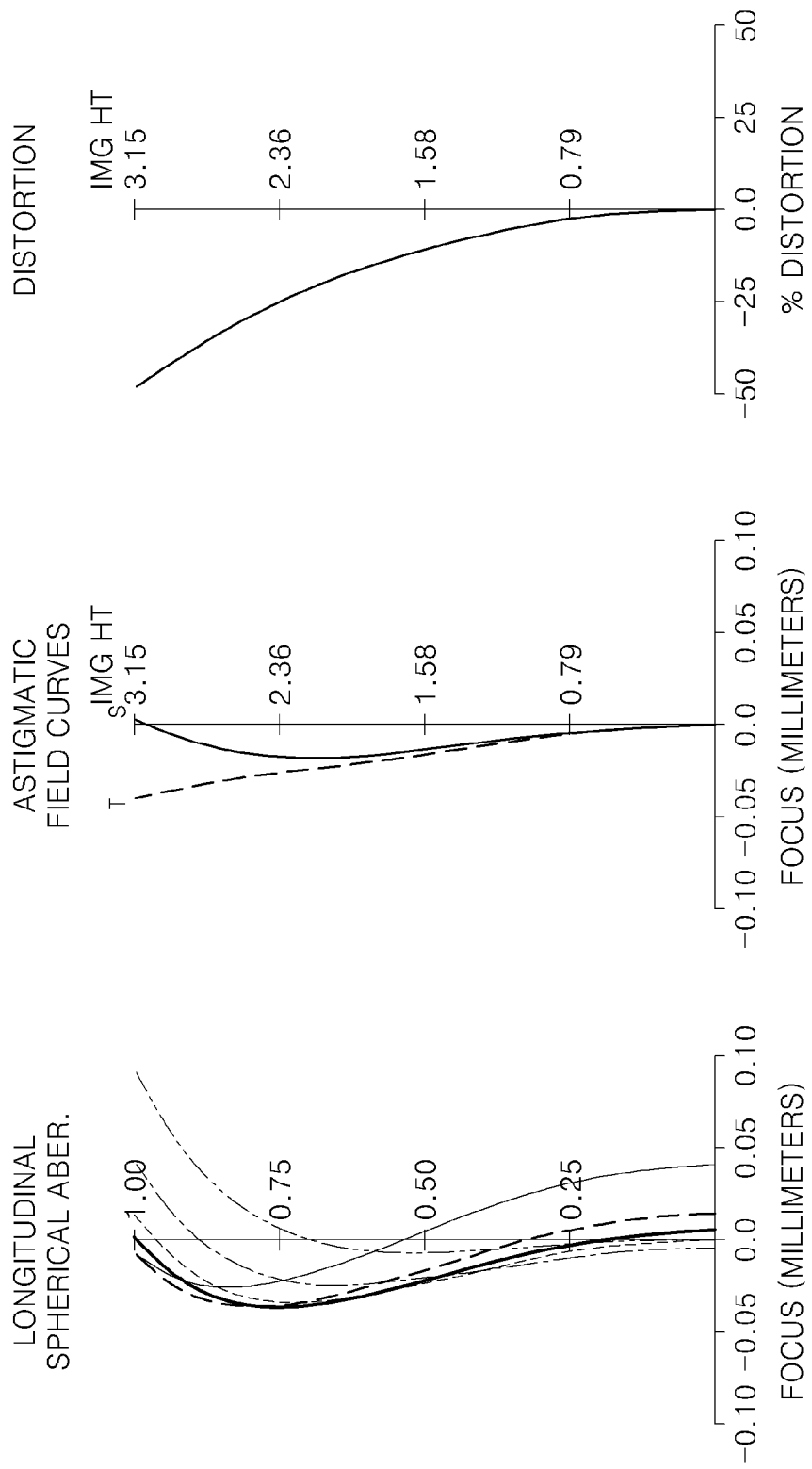
FIG. 7 illustrates spherical aberration, astigmatic field curves, and distortion of the fixed focus lens system of FIG. 6, according to an exemplary embodiment.
Figure 8:
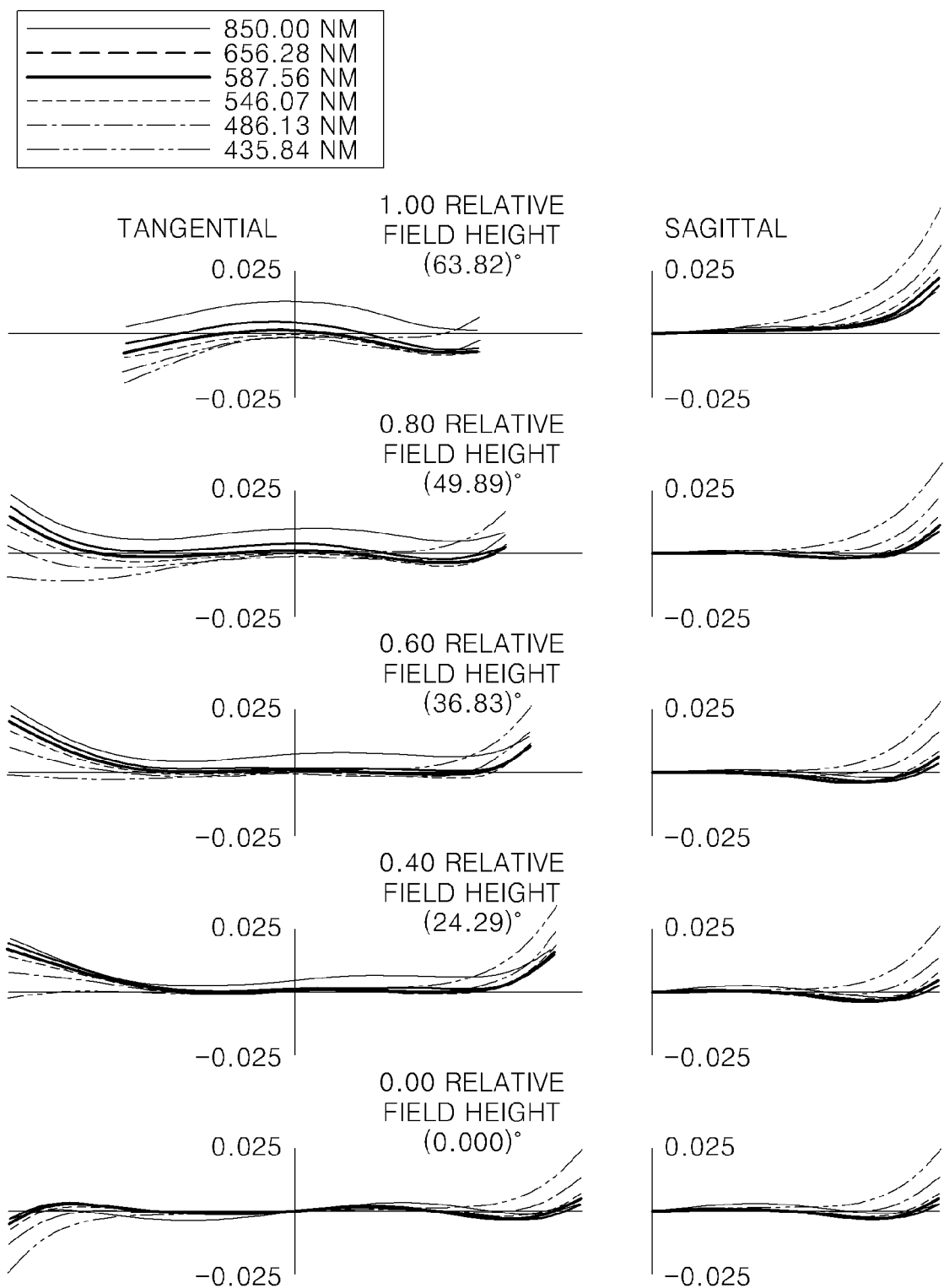
FIG. 8 illustrates coma aberration of the fixed focus lens system of FIG. 6, according to an exemplary embodiment.

FIG. 6 illustrates an optical arrangement of a fixed focus lens system according to another exemplary embodiment. FIG. 7 illustrates spherical aberration, astigmatic field curves, and distortion of the fixed focus lens system of FIG. 6. FIG. 8 illustrates coma aberration of the fixed focus lens system of FIG. 6.

Figure 9:
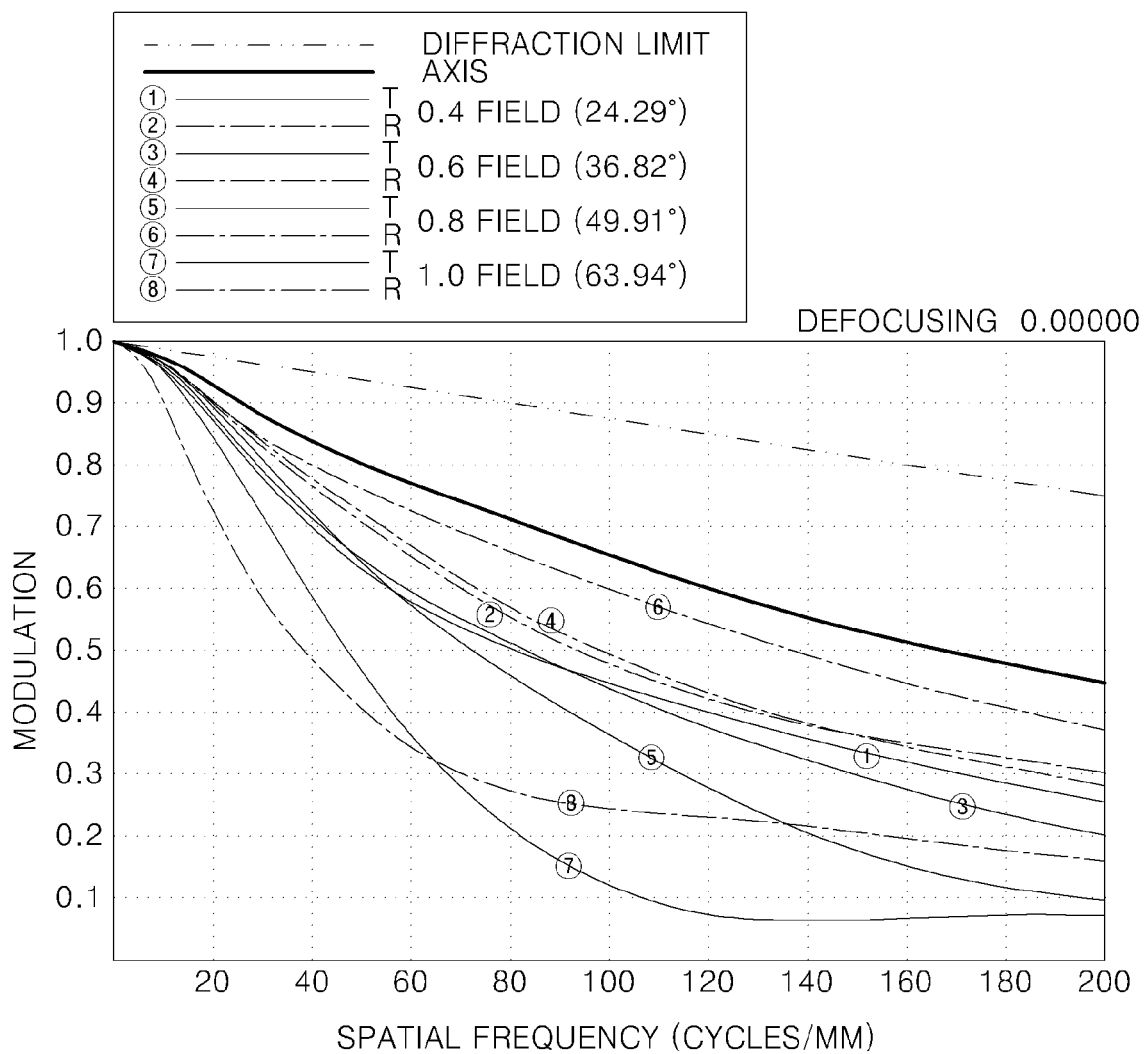
FIG. 9 is a modulus transfer function (MTF) graph of visible rays of the fixed focus lens system of FIG. 6, according to an exemplary embodiment.
Figure 10:
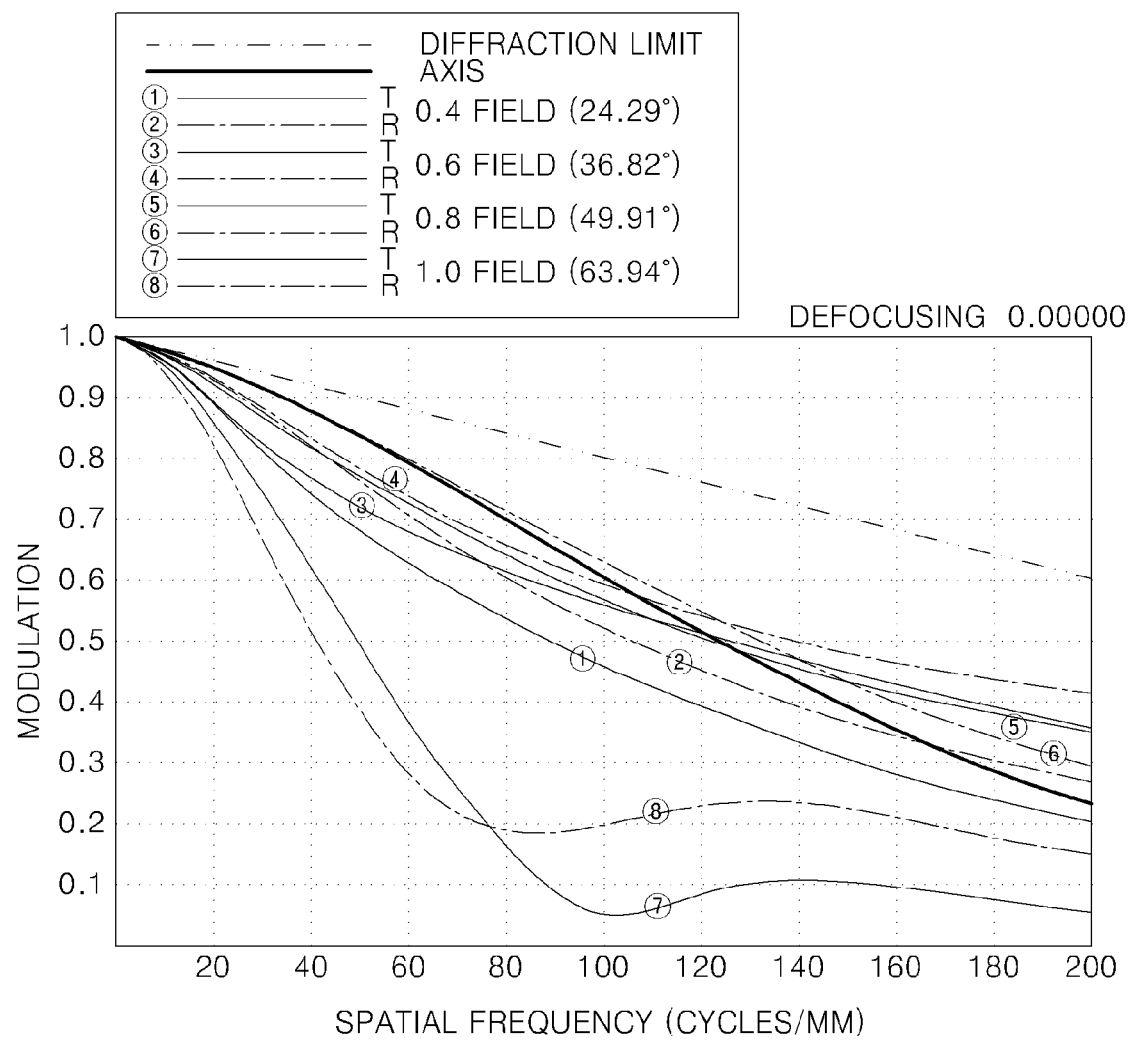
FIG. 10 is a MTF graph of near-infrared rays of the fixed focus lens system of FIG. 6, according to an exemplary embodiment.

FIG. 9 is a MTF graph of visible rays of the fixed focus lens system of FIG. 6. FIG. 10 is a MTF graph of near-infrared rays of the fixed focus lens system of FIG. 6.

Tables 3 and 4 show lens data of the fixed focus lens system of FIG. 6.

TABLE 3

| EFL | 3.00 |
|---|---|
| Fno | 1.83 |
| |f1/f2| | 1.056 |
| 2ω | 127.64° |

TABLE 4

| Field | Curvature radius | Thickness or distance | Refractive index | Abbe's number |
|---|---|---|---|---|
| 1 | 16.58 | 1.00 | 1.744002 | 44.7200 |
| 2 | 6.00 | 5.20 | | |
| 3 | −63.99 | 0.90 | 1.620409 | 60.3438 |
| 4 | 5.00 | 2.39 | | |
| 5 | 23.71 | 2.48 | 1.846663 | 23.7848 |
| 6 | −29.98 | 7.63 | | |
| 7 | 18.16 | 1.95 | 1.496997 | 81.6084 |
| 8 | −8.43 | 0.20 | | |
| 9 | 8.60 | 2.21 | 1.496997 | 81.6084 |
| 10 | −5.92 | 0.70 | 1.846663 | 23.7848 |
| 11 | −15.48 | 1.75 | | |
| 12 | Infinity | 3.75 | | |
| 13 | Infinity | 2.10 | 1.516800 | 64.1673 |
| IMG | Infinity | 3.00 | | |

According to the exemplary embodiments, the fixed focus lens system having the above-described lens structure has a large viewing angle and high luminance.

The fixed focus lens system according to the exemplary embodiments may be used in an image capturing apparatus together with an imaging device that converts an optical image formed by using the fixed focus lens system into an electrical signal. The image capturing apparatus may sense a motion of an object distributed in a large area, not only during the day but also at night, according to a small defocus with respect to a variation in wavelengths and luminance of the above-described zoom lens system. Thus, the image capturing apparatus may be used as, for example, a surveillance camera.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. A fixed focus lens system comprising:
a first lens group having a negative refractive power and comprising a first lens having a negative refractive power, a second lens having a negative refractive power, and a third lens having a positive refractive power, wherein the first through third lenses are sequentially arranged from an object side to an image side; and
a second lens group having a positive refractive power and comprising two lenses having an Abbe's number of 80 or greater, wherein the second lens group comprises a fourth lens having a positive refractive power, a fifth lens having a positive refractive power, and a sixth lens having a negative refractive power, wherein the fourth through sixth lenses are sequentially arranged from the object side to the image side,
wherein the first lens group and the second lens group are sequentially arranged from the object side to the image side.

2. The fixed focus lens system of claim 1, wherein the fifth lens and the sixth lens form a doublet lens.

3. The fixed focus lens system of claim 1, wherein the fourth lens is formed of a material having an Abbe's number of 80 or greater.

4. The fixed focus lens system of claim 1, wherein the fifth lens is formed of a material having an Abbe's number of 80 or greater.

5. The fixed focus lens system of claim 1, wherein the first through sixth lenses are spherical lenses.

6. The fixed focus lens system of claim 1, wherein an Abbe's number v3 of the third lens and an Abbe's number v4 of the fourth lens satisfy the following condition:

$$0.25 < v3/v4 < 0.33.$$

7. The fixed focus lens system of claim 1, wherein a focal length f1 of the first lens group and a focal length f2 of the second lens group satisfy the following condition:

$$0.94 < |f1/f2| < 1.06.$$

8. The fixed focus lens system of claim 1, wherein an F-number is equal to or less than 1.85.

9. The fixed focus lens system of claim 1, wherein a back focal length BFL and an entire focal length EFL satisfy the following condition:

$$BFL/EFL > 2.5.$$

10. A surveillance camera comprising:
a fixed focus lens system of claim 1;
an imaging device converting an optical image formed by using the fixed focal lens system, into an electrical signal; and
a day-and-night filter converting unit disposed between the fixed focus lens system and the imaging device.

11. A fixed focus lens system consisting of:
a first lens group having a negative refractive power; and
a second lens group having a positive refractive power, wherein the first lens group and the second lens group are sequentially arranged from an object side to an image side, wherein the second lens group consists of first, second and third lenses of which two lenses have an Abbe's number of 80 or greater, wherein the first lens has a positive refractive power, the second lens has a positive refractive power, and the third lens has a negative refractive power, and wherein the first, second and third lenses are sequentially arranged from an object side to an image side.

12. The fixed focus lens system of claim 11, wherein the second lens and the third lens form a doublet lens.

13. The fixed focus lens system of claim 11, wherein the first lens is formed of a material having an Abbe's number of 80 or greater.

14. The fixed focus lens system of claim 11, wherein the second lens is formed of a material having an Abbe's number of 80 or greater.

15. The fixed focus lens system of claim 11, wherein the first through third lenses are spherical lenses.

* * * * *